(12) United States Patent
Kim et al.

(10) Patent No.: US 9,336,199 B2
(45) Date of Patent: May 10, 2016

(54) AUTOMATIC SENTENCE EVALUATION DEVICE USING SHALLOW PARSER TO AUTOMATICALLY EVALUATE SENTENCE, AND ERROR DETECTION APPARATUS AND METHOD OF THE SAME

(71) Applicant: SK TELECOM CO., LTD., Seoul (KR)

(72) Inventors: Seunghwan Kim, Seongnam-si (KR); Dongnam Kim, Seoul (KR); Eunsook Lee, Seoul (KR); Sung Kim, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 186 days.

(21) Appl. No.: 14/076,641

(22) Filed: Nov. 11, 2013

(65) Prior Publication Data

US 2014/0067379 A1    Mar. 6, 2014

Related U.S. Application Data

(63) Continuation of application No. PCT/KR2012/008751, filed on Oct. 24, 2012.

(30) Foreign Application Priority Data

Nov. 29, 2011  (KR) .................. 10-2011-0125967

(51) Int. Cl.
   *G06F 17/27* (2006.01)
(52) U.S. Cl.
   CPC ............ *G06F 17/274* (2013.01); *G06F 17/271* (2013.01); *G06F 17/273* (2013.01)
(58) Field of Classification Search
   CPC ... G06F 17/27; G06F 17/2705; G06F 17/271; G06F 17/273; G06F 17/274; G06F 17/2755; G06F 17/277; G06F 17/2775
   See application file for complete search history.

(56) References Cited

U.S. PATENT DOCUMENTS

| | | | | |
|---|---|---|---|---|
| 4,787,038 A | * | 11/1988 | Doi et al. ........................ | 704/2 |
| 5,099,425 A | * | 3/1992 | Kanno et al. .................... | 704/9 |
| 6,161,083 A | * | 12/2000 | Franz et al. ..................... | 704/4 |
| 6,243,669 B1 | * | 6/2001 | Horiguchi et al. ............... | 704/9 |

(Continued)

FOREIGN PATENT DOCUMENTS

| | | |
|---|---|---|
| JP | 2002297585 A | 10/2002 |
| KR | 100413784 B1 | 12/2003 |

(Continued)

OTHER PUBLICATIONS

Li Wei, Research on Automatic Recognition of Sentence Patterns of Modern Chinese, Doctorate Thesis, Jul. 15, 2008, Xiamen University, China.

(Continued)

*Primary Examiner* — Eric Yen
(74) *Attorney, Agent, or Firm* — Hauptman Ham, LLP

(57) ABSTRACT

An automatic sentence evaluating device using a shallow parser. A simple grammatical error and an error in sentence structure are detected by generating a string of parts of speech using n-gram for a composed input sentence and parsing the generated string of parts of speech on the basis of a rule (shallow parsing) defined according to a connective relationship between adjacent parts of speech, and a corrected draft is proposed for the detected errors to thereby increase accuracy of sentence evaluation, and an error detection apparatus and a method for the same.

1 Claim, 6 Drawing Sheets

(56) References Cited

U.S. PATENT DOCUMENTS

| | | | |
|---|---|---|---|
| 6,782,505 B1* | 8/2004 | Miranker et al. | 715/203 |
| 6,816,830 B1* | 11/2004 | Kempe | 704/9 |
| 6,901,360 B1* | 5/2005 | Dymetman et al. | 704/2 |
| 7,289,948 B1* | 10/2007 | Mohri | 704/9 |
| 8,713,031 B1* | 4/2014 | Lee | 707/755 |
| 8,849,648 B1* | 9/2014 | Bangalore et al. | 704/9 |
| 2001/0047346 A1* | 11/2001 | Liu et al. | 706/13 |
| 2002/0046018 A1* | 4/2002 | Marcu et al. | 704/9 |
| 2003/0036900 A1* | 2/2003 | Weise | 704/9 |
| 2003/0121026 A1* | 6/2003 | Wang et al. | 717/124 |
| 2005/0049881 A1 | 3/2005 | Xun | |
| 2006/0015317 A1* | 1/2006 | Nakagawa | 704/1 |
| 2008/0256108 A1* | 10/2008 | Heinze et al. | 707/102 |
| 2010/0049500 A1* | 2/2010 | Kobayashi et al. | 704/9 |
| 2011/0046943 A1* | 2/2011 | Lee et al. | 704/9 |
| 2013/0030787 A1* | 1/2013 | Cancedda et al. | 704/2 |
| 2014/0082003 A1* | 3/2014 | Feldman et al. | 707/755 |

FOREIGN PATENT DOCUMENTS

| | | |
|---|---|---|
| KR | 1020080028655 A | 4/2008 |
| KR | 100892004 B1 | 3/2009 |
| KR | 1020100072730 A | 7/2010 |

OTHER PUBLICATIONS

Chinese Office Action for corresponding Chinese Application No. 201280019540.3 dated Apr. 29, 2015.
International Search Report mailed Feb. 26, 2013 for PCT/KR2012/008751.
Korean Office Action for application No. 10-2011-0125967 dated Jun. 26, 2014.

* cited by examiner

FIG. 3

| ITEM | RULE | EXAMPLE |
|---|---|---|
| SPELLING ERROR | "impartant" -> "important"<br>"becoase" -> "because"<br>"goed" -> "went" | |
| SPACING ERROR | "my" "self" -> "myself" | |
| FORM OF ARTICLE | "an" "ufo" -> "a" $2 | |
| OVERLAPPING OF ARTICLES | DT DT -> ( $1 | $2 ) | the my heart |
| SUBJECT-VERB NON-AGREEMENT | a NP[ NNS ] -> $1 $2[ NN ]<br>each NP[ NNS ] -> $1 $2[ NN ] | a children<br>each countries |
| MIXED USAGE OF PART OF SPEECH | PRP MD NN -> $0 | I can memory |
| VERB FORM ERROR | remember VB -> $1 ( VBG | to VB ) | remember go |
| INCORRECT LANGUAGE | do NP[ mistake ] -> make $2<br>give PRP NP[ damage ] -> cause $2 $3<br>thick coffee -> strong $2 | |
| INCORRECT WORD ORDER | turn off PRP -> $1 $3 $2 | turn off them |
| PREPOSITION MISSING | go NP[ +place ] -> $1 to $2<br>listen NP -> $1 to $2 | go the library<br>listen music |
| COMPARATIVE FORM ERROR | more JJR -> $2 | more better |
| UNNECESSARY DETERMINER | my something -> $2 of mine | |
| UNNECESSARY PREPOSITION | discuss about -> $1<br>enter into NP[ +place ] -> $1 $3 | |

FIG. 6

| OBJECT TO BE PROCESSED | DATA OR RESULT TO BE PROCESSED |
|---|---|
| INPUT TEXT | <s> 나는 그가 수습하리라고는 또한 그의 모국이 한국이리라고는 꿈에도 생각하지 못했다 </s><br><s> 한국은 민주공화국이다 </s><br><s> 오늘 밥은 다 먹었다 </s> |
| PART OF SPEECH TAGGING | <s> 나/nc+는/j 그/np+가/j 수습/nc+하/xsp+리라고는/c 또한/ma 그의/mm 모국/nc+이/j 한국/nq+이/j+리라고는/c 꿈에도/ma 생각/nc+하/xsp+지/c 못하/pv+았/c+다/c </s><br><s> 한국/nq+은/j 민주/nc+공화국/nc+이/j+다/c </s><br><s> 오늘/nc 밥/nc+은/j 다/nc 먹/pv+았/c+다/c </s> |
| PART-OF-SPEECH STRING | <s> nc+j np+j nc+xsp+c ma mm nc+j nq+j+c ma nc+xsp+c pv+c+c </s><br><s> nq+j nc+nc+j+c </s><br><s> nc nc+j nc pv+c+c </s> |

“AUTOMATIC SENTENCE EVALUATION DEVICE USING SHALLOW PARSER TO AUTOMATICALLY EVALUATE SENTENCE, AND ERROR DETECTION APPARATUS AND METHOD OF THE SAME”

CROSS-REFERENCE TO RELATED APPLICATION

The present application is a continuation of International Application No. PCT/KR2012/008751 which is based on, and claims priority from, Korean Patent Application Serial No. 10-2011-0125967 filed on Nov. 29, 2011. The disclosure of the above application is hereby incorporated by reference herein in its entirety.

FIELD

The present disclosure relates to error detection for automatically evaluating composition of a sentence, and more particularly, to an apparatus and a method for automatically evaluating sentences and an error detection apparatus for this purpose, by dividing a composed input sentence into morphemes, tagging parts of speech to the divided morphemes, detecting simple grammatical English composition errors of each part-of-speech string, and parsing them based on a rule defined by a connection relationship of parts of speeches adjacent to each other, to enhance the accuracy of the evaluation of composition.

BACKGROUND

Recently, the Korean SAT and the grade-based evaluation of enterprises have been changed into a real English performance evaluation depending on speaking and writing.

That is, the Ministry of Education has developed NEAT (National English Ability Test, which is an Internet-based evaluation of listening, reading comprehension, speaking and writing) and is enforcing it by demonstration, and plans to replace the civil service examination and an English test of the SAT. In such an English performance evaluation, an automatic composition evaluation system is introduced for evaluating writing ability.

The automatic composition evaluation system grammatically analyzes a composed sentence and evaluates it through error detection whether or not it is composed grammatically. In this case, in the process of analyzing the composed sentence, it is necessarily required to have processes of dividing the sentence into morphemes, tagging a part of speech to each morpheme and performing a syntax analysis. However, a conventional syntax analysis does not consider a vocabulary, a part of speech, a meaning and a context correlation complexly, but only depends on part-of-speech string information, whereby there is a problem that the accuracy thereof is significantly decreased.

In particular, since a natural language has a variety of phenomena having interdependent relationships in context, a generally defined grammar has a limitation in a syntax analysis. For instance, in a case that a word is to be parsed into a 'verb' through a syntax analysis, it could be parsed into not a 'verb' but a 'noun' due to the part of speech of the adjacent word. In this case, there is a problem in which two or more syntax trees are extracted through a syntax analysis and the syntax analysis thereof becomes ambiguous.

Accordingly, there is a need to have a solution to enhance an automatic evaluation system by performing a correct syntax analysis on a connection relationship between adjacent parts of speech of a tagged input sentence.

SUMMARY

In accordance with some embodiments, provided are an automatic sentence evaluating device, an error detection apparatus and a related method, using a shallow parser, whereby a simple grammatical error and an error in sentence structure are detected by generating a string of parts of speech using n-gram for a composed input sentence and parsing the generated string of parts of speech on the basis of a rule (shallow parsing) defined according to a connective relationship between adjacent parts of speech, and a corrected draft is proposed for the detected errors to thereby increase accuracy of sentence evaluation.

In accordance with some embodiments, an apparatus for automatically evaluating sentences includes an input sentence divider, a part-of-speech tagging section, a syntax analyzer, a sentence evaluating section, and an error detector. The input sentence divider is configured to divide a composed input sentence into morphemes which are the smallest units of a sentence. The part-of-speech tagging section is configured to tag parts of speech to the divided morphemes. The syntax analyzer is configured to analyze a syntax structure of the sentence based on the parts of speech and to output a syntax tree as an analysis result. The sentence evaluating section is configured to evaluate whether the sentence is grammatically correct by using the syntax tree output by the syntax analyzer. The error detector is configured to generate a part-of-speech string by using an n-gram with respect to each part of speech tagged by the part of speech tagging section, to analyze the generated part-of-speech string based on a regular grammar rule and a context free grammar rule which are defined in accordance with connection relationships between the parts of speech adjacent to each other to detect an error of syntax analysis, and to provide a correction for the detected error.

In accordance with some embodiments, an error detection apparatus using a shallow parser for automatically evaluating composition of a sentence includes a part-of-speech string generator, a shallow parser, an error detector, and an error correcting section. The part-of-speech string generator is configured to generate a part-of-speech string by a certain window unit using an n-gram with respect to each of parts of speech tagged to an input sentence. The shallow parser is configured to parse the part-of-speech string based on a context free grammar rule and a regular grammar rule and to calculate an intimacy degree of the part-of-speech string. The error detector is configured to detect an error in accordance with the intimacy degree calculated by the shallow parser. The error correcting section is configured to provide a correction to the error detected by the error detector.

In accordance with some embodiments, an error detection method using a shallow parser for automatically evaluating composition of a sentence includes generating a part-of-speech string by a certain window unit using an n-gram with respect to each of parts of speech tagged to an input sentence, parsing the part-of-speech string based on a context free grammar rule and a regular grammar rule and thereby calculating an intimacy degree of the part-of-speech string, detecting an error in accordance with the calculated intimacy degree, and providing a correction to the detected error.

According to embodiments disclosed herein, by analyzing a composed input sentence in consideration of a typical rule of a language as well as a dependent relationship between adjacent parts of speech, there is an effect in which accuracy of detecting grammatical errors is increased to enhance the capability of automatic sentence evaluation.

In addition, by generating a part-of-speech string in accordance with a predetermined pattern and performing an analysis by the generated part-of-speech string unit, there is an effect in which an ambiguity of syntax analysis is reduced compared to a conventional full parsing and it is possible to detect the types of error in detail.

BRIEF DESCRIPTION OF DRAWINGS

FIG. 3 is a table showing examples of a regular grammar.

FIG. 6 is an exemplary table showing a process of generating a part-of-speech string through the error detection method of FIG. 4.

DETAILED DESCRIPTION

The following description makes reference to the accompanying drawings in detail. However, one of ordinary skill in the art will understand the following description is not limited to the embodiments specifically disclosed below and is implemented in various forms and the scope of the following description is not limited to the following embodiments. Well known techniques, elements, structures, and processes will be omitted to avoid obscuring the subject matter of the disclosure.

Figure 1:
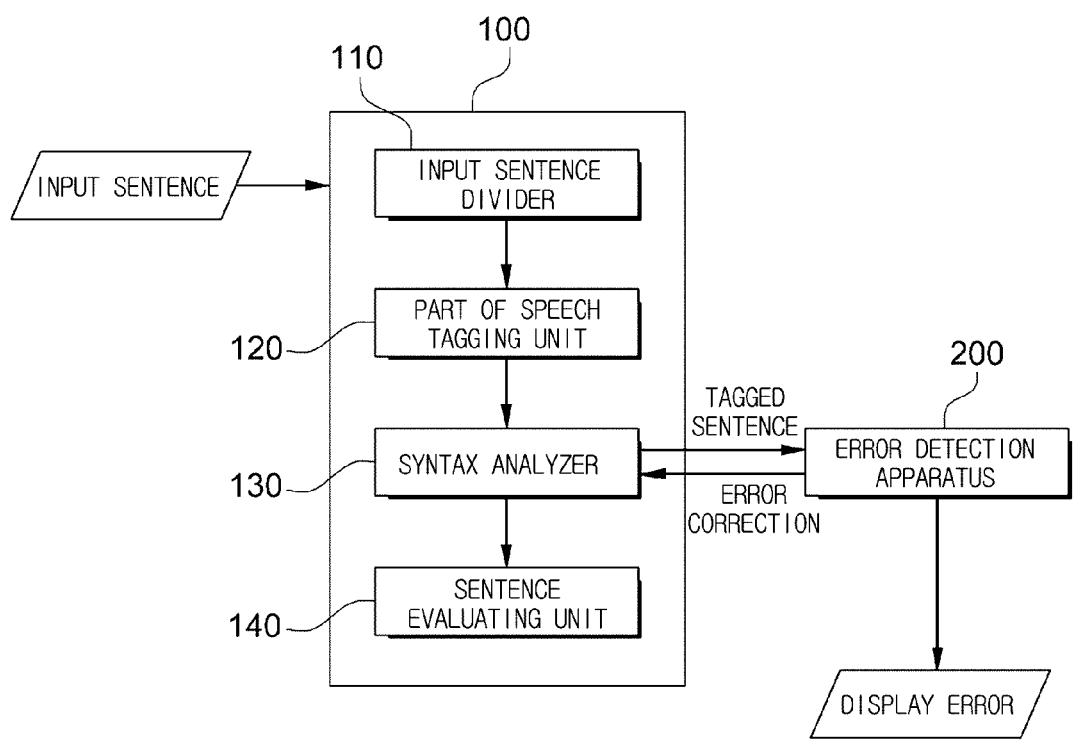
FIG. 1 shows a configuration of an error detection apparatus for automatic composition evaluation in accordance with at least one embodiment.

FIG. 1 shows a configuration of an error detection apparatus for automatic composition evaluation in accordance with at least one embodiment.

As shown in FIG. 1, provided are an automatic sentence evaluation device 100 which analyzes a composed input sentence and evaluates whether a composition is correctly made, and an error detection apparatus 200 which detects an error of a syntax analysis at the time of automatically evaluating sentences and presents a corrected draft for the detected error.

In FIG. 1, for better understanding, there is shown an example in which the configuration of error detection, that is, the error detection apparatus 200 is independently configured from the automatic sentence evaluation device 100. However, the error detection apparatus 200 may be alternatively formed as a single apparatus contained in the automatic sentence evaluation device 100.

The automatic sentence evaluation device 100 receives the composed input sentence as data, and includes, as configurations for evaluating the input sentence, an input sentence divider 110, a part-of-speech tagging section 129, a syntax analyzer 130, a sentence evaluating section 140, etc.

The input sentence divider 110 divides a composed input sentence (hereinafter, referred to as an 'input sentence') into sentences and morphemes.

Here, the division of the sentence means that the composed input sentences are divided into several sentences by means of punctuation symbols such as a period, a question mark, an exclamation mark, etc.

The division into morphemes means that each sentence divided through the division of sentence is divided into morphemes which are the smallest units of sentence. In case of an English composition, since a postpositional particle is not attached to a word due to the characteristics of the language, the morpheme which is the smallest unit may be a word itself.

The part of speech tagging section 120 tags a corresponding part of speech to each morpheme divided in the input sentence divider 110. The tagging of parts of speech may be carried out with reference to a part of speech dictionary which is already stored. For example, the types of parts of speech comprise nouns, verbs, prepositions, adjectives, adverbs, articles, interjections, etc.

The syntax analyzer 130 analyzes a syntax structure of each sentence based on the part of speech tagged in the part of speech tagging section 120 and outputs a syntax tree as an analysis result. Generally, "parsing" refers to analyzing the syntax of a sentence, and "a parser" refers to a program that causes a syntax tree to be output in order to know whether a character string can be generated by a grammar.

At parsing, the syntax analyzer 130 transmits a sentence whose parts of speech are tagged for minimizing errors of the syntax analysis, and receives information of the detected errors from the error detection apparatus 200 to apply it to the syntax tree.

The sentence evaluating section 140 makes reference to the syntax tree extracted in the syntax analyzer 130 and evaluates whether the composition is correctly made. The final result of composition may be output after being converted into a score, or may be output by T/F (true/false) marks.

The error detection apparatus generates a part-of-speech string by using n-gram for the transmitted sentence from the syntax analyzer 130, and analyzes the generated part-of-speech string on the basis of a simple grammar rule and a grammar rule defined according to a connective relationship between adjacent parts of speech, whereby a simple error in an English composition as well as an error according to the connective relationship between adjacent parts of speech is detected.

In addition, the error detection apparatus 200 displays the detected error and proposes a corrected draft to the syntax analyzer 130.

Figure 2:
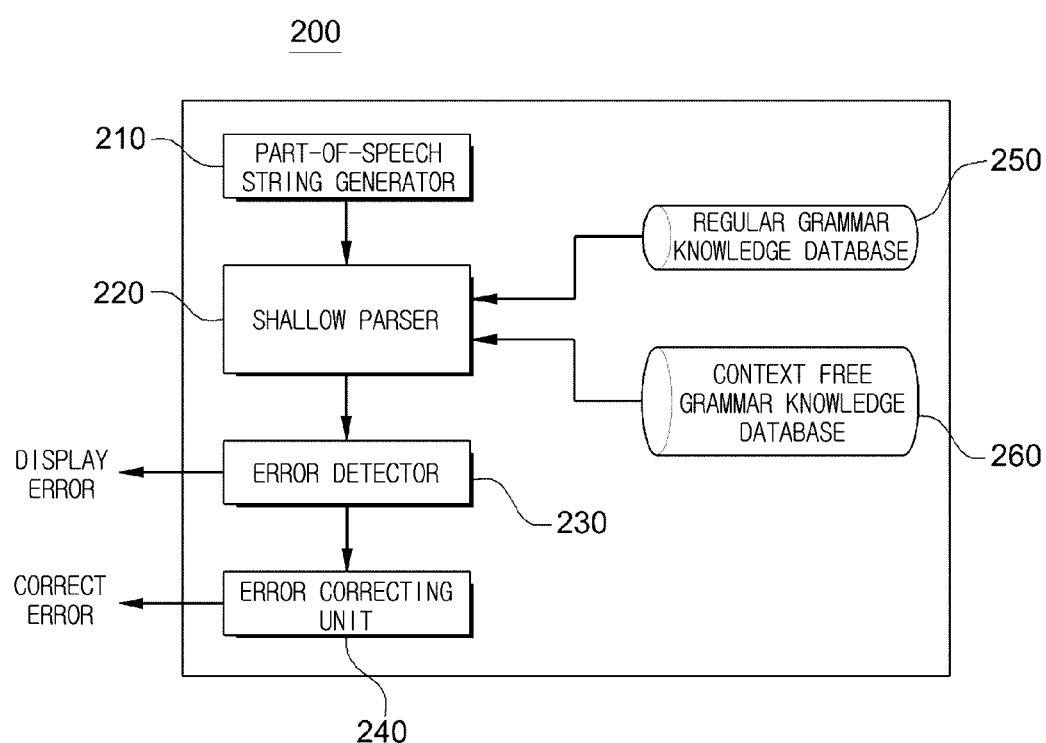
FIG. 2 shows a detailed configuration of an error detection apparatus in accordance with at least one embodiment.

FIG. 2 shows a detailed configuration of an error detection apparatus in accordance with at least one embodiment.

The error detection apparatus 200 includes a part-of-speech string generator 210, a shallow parser 220, an error detector 230, an error correcting section 240, a formal grammar knowledge DB 250, a context free grammar knowledge DB 260, etc., as shown in the figure.

The part-of-speech string generator 210 generates a part-of-speech string for each part of speech by using n-gram which ties each part of speech tagged in the part of speech tagging section 120 in any window size.

For example, an input sentence "I went to go to school." is extracted to 'I/noun', 'went/verb', 'to/preposition', 'go/verb', 'to/preposition', 'school/noun' by the division of morphemes and the tagging of parts of speech, and in the part-of-speech string generator 210, 'I went to', 'went to go', 'go to school', 'to school (null)', 'school (null) (null),' etc. can be generated by applying Tri-gram as a part-of-speech string for each part of speech.

The part-of-speech string generator 210 sets the window size in advance, and utilizes it in the error detection by generating a part of speech corresponding to the set window size. For a detailed detection, each part of speech may be generated and analyzed by varying the window size such as bi-gram and tri-gram.

The shallow parser 220 parses a syntax structure by considering the connective relationship between parts of speech adjacent to each other on the basis of a regular grammar rule and a context free grammar (CFG) rule for the part-of-speech string generated by the part-of-speech string generator 210.

The context free grammar rule is called a general English grammar, and comprises a rule that normalizes a rule related to orthography, an article or a tense.

For example, it comprises such rules that 's' is attached to a verb whose tense is a simple present tense and whose subject is a singular form and that 'an' is used with a noun starting with a vowel sound and 'a' is used with a noun starting with a consonant sound.

This context free grammar rule is stored in the context grammar free knowledge DB 260 and provides it in case of parsing of the shallow parser 220.

The regular grammar rule defines an exception rule that cannot be defined by a general grammar, that is, the context free grammar, and can be further defined in accordance with an intimacy degree or a connective relationship between parts of speech adjacent to each other. Specifically, as shown on FIG. 3, a rule can be defined with respect to an orthography, the spacing between words, the form of an article, overlapping of articles, subject-verb non-agreement, mixed use of part of speech, an error of verb form, an incorrect collocation, an incorrect word order, a missing preposition, a grammatical person, an unnecessary determiner, an unnecessary preposition, etc.

For example, it is a context free grammar that an article 'a' is generally attached in front of a consonant while an article 'an' is attached in front of a noun whose first syllable is silent. However, it is the regular grammar that an article 'an' is attached in front of a noun 'hoest.' That is, adding a noun which is applied as an exception of the context free grammar rule as an individual rule is the regular grammar.

In addition, as another example of the regular grammar rule, in the case of a typographical error such as 'beggining,' it is analyzed that 'beginning' is incorrectly used, and a corrected draft 'beginning' may be detected.

Such a regular grammar rule is stored in the regular grammar knowledge DB 250 and may be proposed for parsing of the shallow parser 220 for reference.

Accordingly, the shallow parser 200 directly analyzes a simple grammar error by using the stored context free grammar rule, and calculates the intimacy degree of the part-of-speech string according to the connective relationship between parts of speech adjacent to each other by using the regular grammar rule. If the intimacy degree of the part of speech is high, the shallow parser 220 generates the corresponding part-of-speech string with an inducement tree such as a noun phrase, a compound word, an object phrase and a dependent clause, and if the intimacy degree is low, the shallow parser 220 generates an inducement tree with words forming each part-of-speech string by using independent words instead of a phrase.

Determining whether the intimacy degree is high or low may be made by setting a reference value for determination and comparing the intimacy degree and the reference value. Or, it may be made by calculating the intimacy degrees of several inducement trees which could be induced from a part-of-speech string and determining the relative magnitudes of the intimacy degrees. In this case, an error may be detected by selecting an inducement tree whose intimacy is relatively the highest.

In addition, the shallow parser 220 performs a bottom-up chart parsing which shifts from right side to left side to the tagged parts of speech. Since the bottom-up chart parsing is not a parsing for a general syntax analysis, making a sentence (S) for an entire object is not a goal. That is, if no node is newly made, the parsing is stopped.

The error detector 230 detects an error from a syntax tree analyzed by the syntax analyzer (130 of FIG. 1) based on the analysis result generated through the shallow parser 220. At this time, the error detector 230 conducts the detection by using an n-gram which divides an input sentence into strings having certain sections, instead of searching the whole input sentence, whereby error detection can be made more rapidly and accurately than an analysis method for the whole sentence.

The error correcting section 150 proposes a corrected draft to the error detected by the error detector 140 on the basis of the context free grammar rule and the regular grammar rule.

Figure 4:
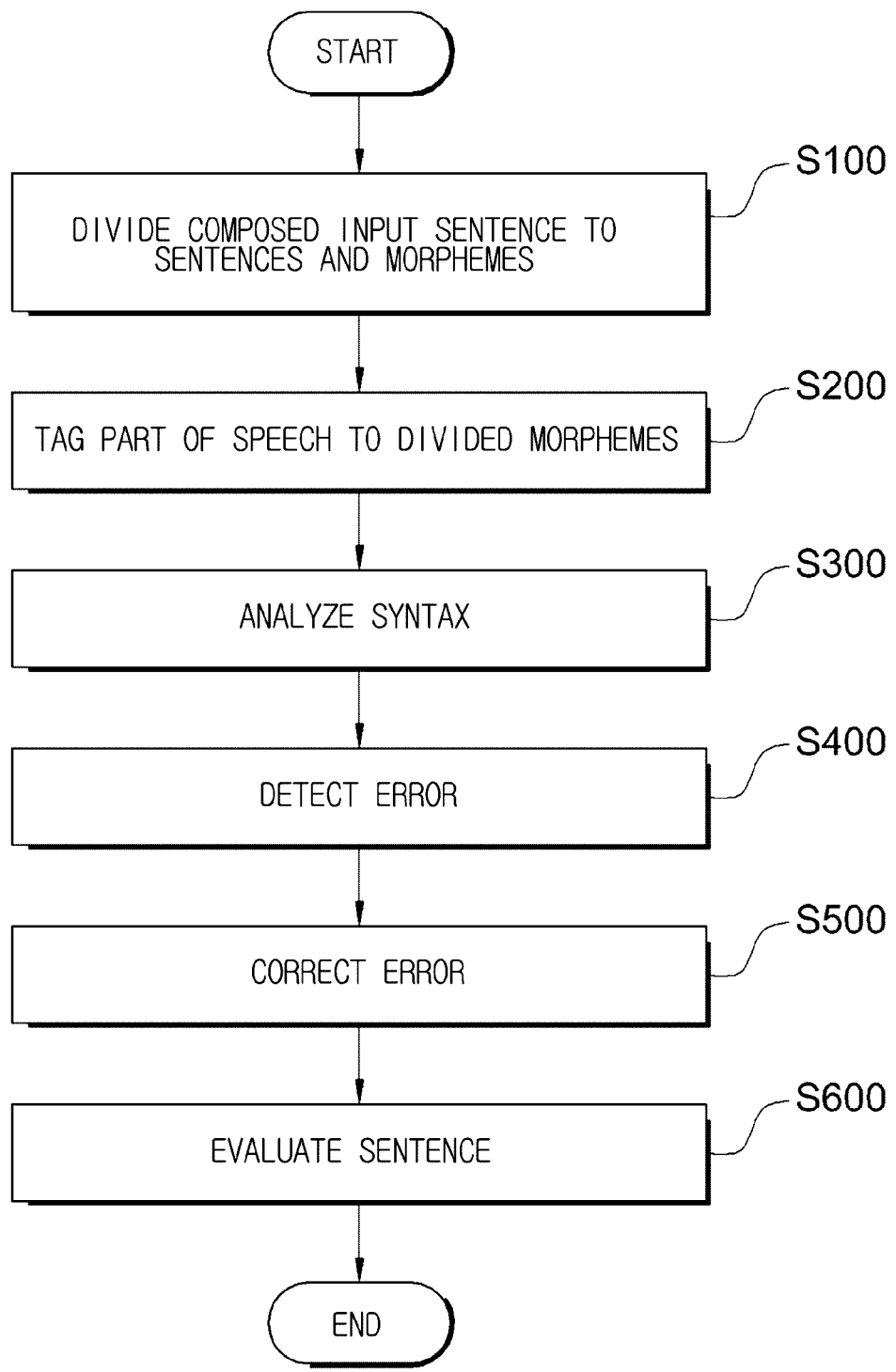
FIG. 4 is a flowchart of a method for an error detection method using an error detection apparatus in accordance with at least one embodiment.

FIG. 4 is a flowchart of a method for an error detection method using an error detection apparatus in accordance with at least one embodiment.

Firstly, for evaluating a sentence, if a composed input sentence is input, an automatic sentence evaluation device divides the input sentence into sentences and morphemes (S100).

Next, the automatic sentence evaluation device tags a part of speech to each morpheme based on a part of speech dictionary (S200).

Next, the automatic sentence evaluation device performs a syntax analysis on a divided sentence and extracts a syntax tree as an analysis result (S300).

In addition, the automatic sentence evaluation device generates a part-of-speech string to each part of speech by using a shallow parser in order to determine whether there is an error in the extracted syntax tree and detects an error by the unit of the generated part of speech string.

After that, the automatic sentence evaluation device corrects the detected error and evaluates the sentence by the corrected syntax tree (S500, S600). The correction may be performed with the corrected draft obtained through the error detection process (S400).

Figure 5:
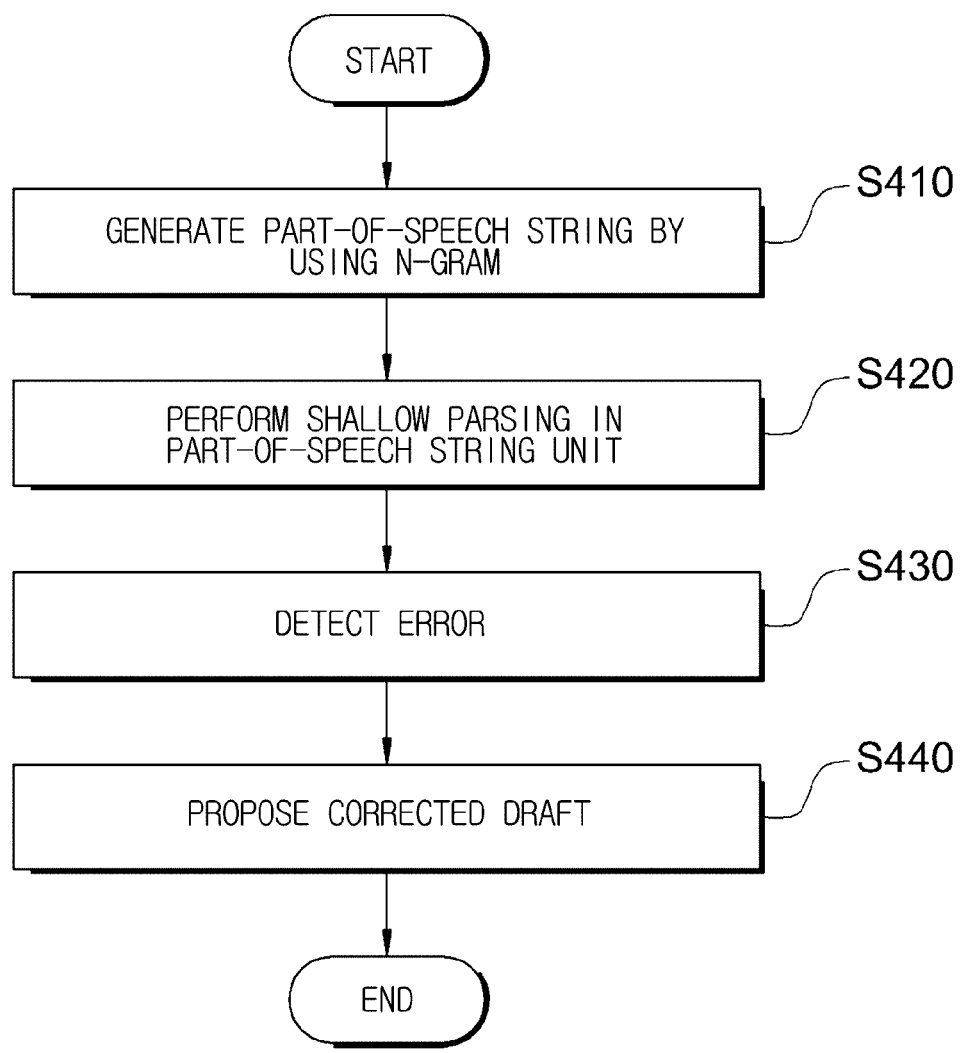
FIG. 5 is a flowchart showing a specific process of detecting errors.

FIG. 5 is a flowchart showing the detailed method of the error detecting process (S400).

The error detecting process (S400) may be implemented by an error detection apparatus included in the automatic sentence evaluation device or by an error detection apparatus separately included from the automatic sentence evaluation device.

That is, for each part of speech tagged in the part of speech tagging process (S200), the error detection apparatus generates a part-of-speech string by a certain window unit (S410).

The certain window means grouping 2, 3 or more (n) parts of speech adjacent to each other. A bi-gram is grouping 2 parts of speech adjacent to each other, while a tri-gram is grouping 3 parts of speech adjacent to each other.

The error detection apparatus generates a part of speech in a set unit by using an n-gram (bi-gram, tri-gram, etc.)

Next, the error detection apparatus performs a shallow parsing in a part-of-speech string unit (S420).

The shallow parsing analyzes a syntax structure in consideration of an intimacy degree between the adjacent parts of speech on the basis of a stored context free grammar rule and a stored regular grammar rule.

Specifically, by using the knowledge of the stored context free grammar rule, a simple grammar error is directly analyzed, and at the same time, by using the knowledge of the stored regular grammar rule, an intimacy degree of parts of speech according to the connective relationship between the parts of speech adjacent to each other. If the intimacy degree of the part of speech is high, the corresponding part-of-speech string with an inducement tree, such as a noun phrase, a compound word, an object phrase and a dependent clause, may be generated, and if the intimacy degree is low, an inducement tree with words forming each part-of-speech string by using independent words instead of a phrase may be generated.

Next, the error detection apparatus detects errors of a syntax tree extracted from a syntax analysis based on the analysis result and proposes a corrected draft for the detected errors (S430, S440).

FIG. 6 is an exemplary table showing a process of generating a part-of-speech string through the error detection method of FIG. 4.

As fully discussed hereinbefore, in the case of a syntax analysis, a conventional syntax analysis does not consider a vocabulary, a part of speech, a meaning and a context correlation complexly, but only depends on part-of-speech string information, whereby there is a problem that the accuracy thereof is significantly decreased. Embodiments disclosed herein can increase accuracy of sentence evaluation for a sentence by detecting a simple grammatical error and an error in sentence structure by generating a part-of-speech string by using an n-gram for a composed input sentence and analyzing the generated part-of-speech string on the basis of a rule defined according to a connective relationship between adjacent parts of speech. In this regard, the disclosed embodiments may not apply a simple evaluation algorithm, but enable an automatic evaluation by being applied to an English ability test, an essay evaluation, etc. which are conducted by an enterprise, or in a university admission test.

While various embodiments have been particularly shown and described, it will be understood by those skilled in the art that various changes in form and details may be made therein without departing from the subject matter and scope of this disclosure. Specific terms used in this disclosure and drawings are used for illustrative purposes and not to be considered as limitations of the present disclosure.

The invention claimed is:

1. An apparatus for automatically evaluating sentences over the internet, wherein the apparatus comprises a processor, and wherein said processor comprises:
    an input sentence divider configured to divide a composed input sentence received via the internet into morphemes which are the smallest units of a sentence;
    a part-of-speech tagging section configured to tag parts-of-speech to the morphemes;
    a syntax analyzer configured
        to analyze, based on the parts-of-speech, a syntax structure of the composed input sentence, and
        to output a syntax tree as an analysis result;
    a sentence evaluating section configured to evaluate whether the composed input sentence is grammatically correct by using the syntax tree output by the syntax analyzer; and
    an error detector configured
        to generate, by using an n-gram, a part-of-speech string for each of the parts-of-speech tagged by the part-of-speech tagging section,
        to detect a syntax error, by analyzing, based on a regular grammar rule and a context free grammar rule, the generated part-of-speech string, wherein
            the regular grammar rule and the context free grammar rule are defined in accordance with a connection relationship, and
            the connection relationship is between adjacent parts-of-speech among the parts-of-speech tagged by the part-of-speech tagging section, and
        to provide a corrected draft of the composed input sentence, wherein the corrected draft corrects the detected syntax error.

* * * * *